I. F. HARRIS.
COTTON CHOPPER.
APPLICATION FILED MAY 21, 1909.

939,253.

Patented Nov. 9, 1909.
4 SHEETS—SHEET 1.

I. F. HARRIS.
COTTON CHOPPER.
APPLICATION FILED MAY 21, 1909.

939,253.

Patented Nov. 9, 1909.
4 SHEETS—SHEET 4.

Witnesses

Irvin F. Harris, Inventor

By C. A. Snow & Co.
Attorneys

UNITED STATES PATENT OFFICE.

IRVIN F. HARRIS, OF FORRESTON, TEXAS.

COTTON-CHOPPER.

939,253.

Specification of Letters Patent.

Patented Nov. 9, 1909.

Application filed May 21, 1909. Serial No. 497,379.

*To all whom it may concern:*

Be it known that I, IRVIN F. HARRIS, a citizen of the United States, residing at Forreston, in the county of Ellis and State of Texas, have invented a new and useful Cotton-Chopper, of which the following is a specification.

This invention has relation to cotton choppers and it consists in the novel construction and arrangement of its parts, hereinafter shown and described.

The object of the invention is to provide a cotton chopper in the form of an attachment which may be easily and quickly applied to the frame of an ordinary cultivator, and as expeditiously removed from the same.

With the above object in view the cotton chopper comprises guides which are adapted to be applied to the frame of the cultivator, and upon which are slidably mounted members in which is journaled a shaft. A disk is adjustably fixed to the shaft and carries a series of hoe blades. Means is provided upon the frame of the cultivator for raising and lowering the said members which are slidably mounted in the guides, and in one of the said guides is journaled a shaft for rotation which is operatively connected with the shaft which carries the disk and hoe-blades. Means is provided for rotating the last said shaft, which means derives its rotary movement from the supporting wheels of the cultivator.

Figure 1:
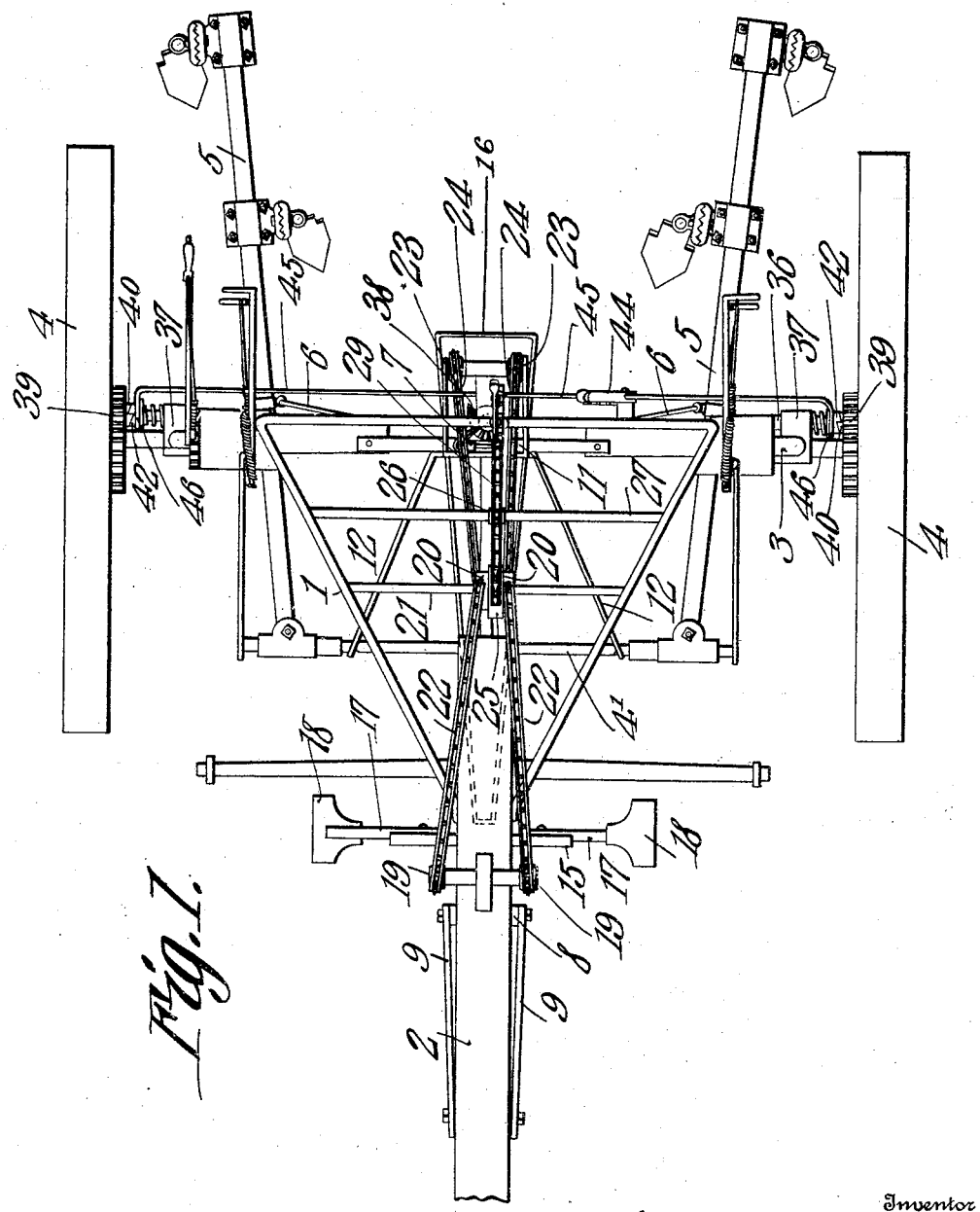
Figure 2:
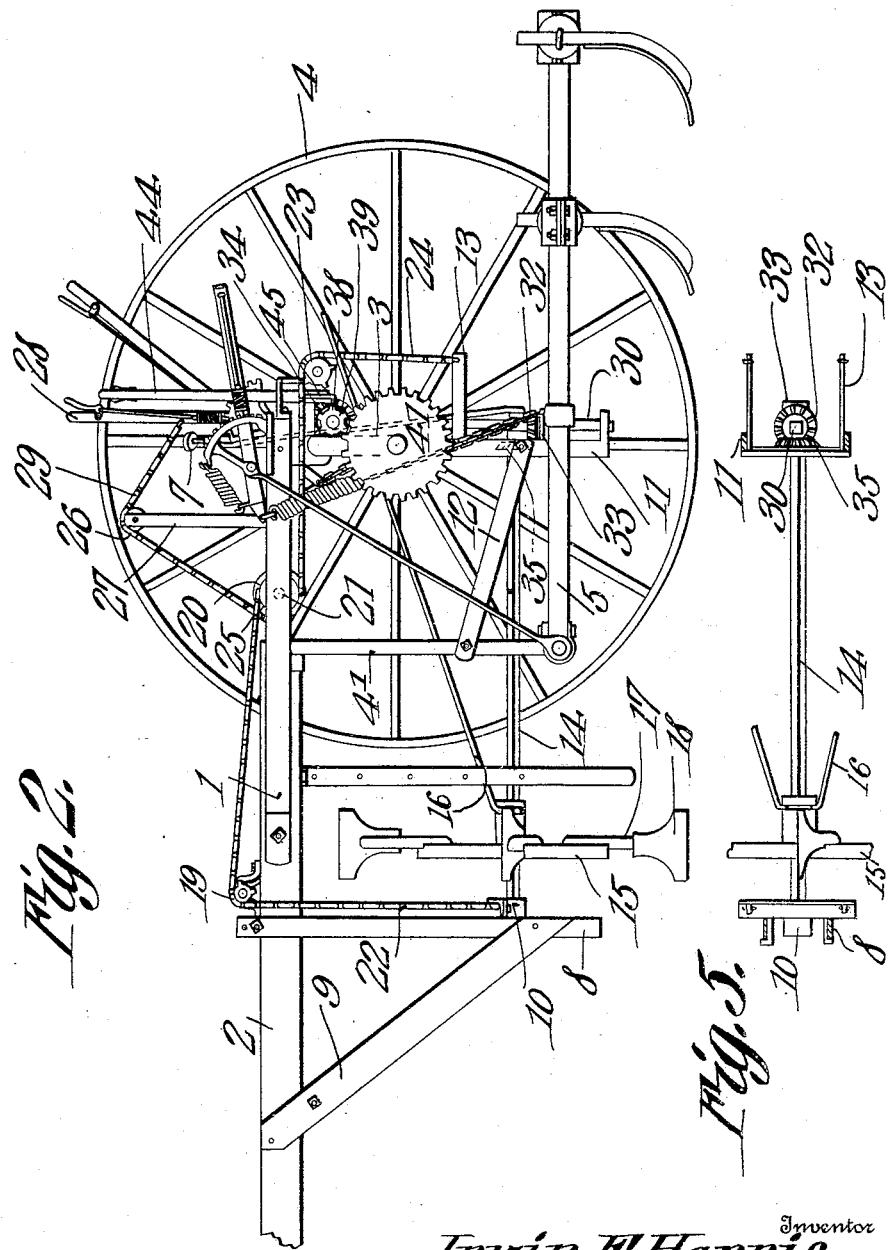
Figure 3:
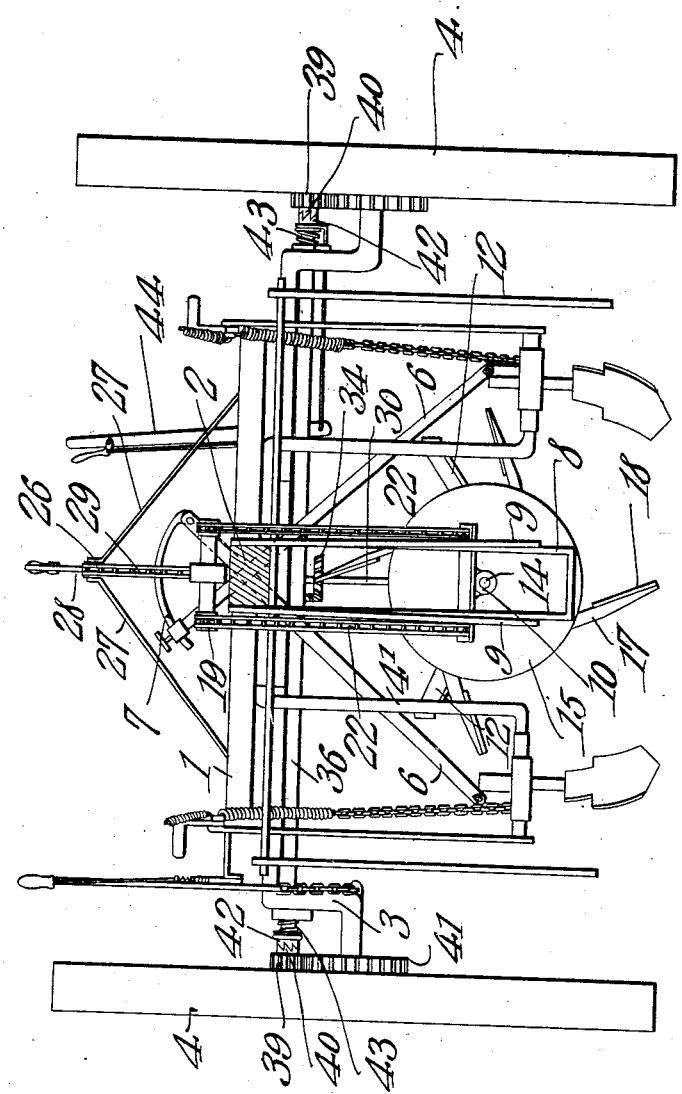
Figure 4:
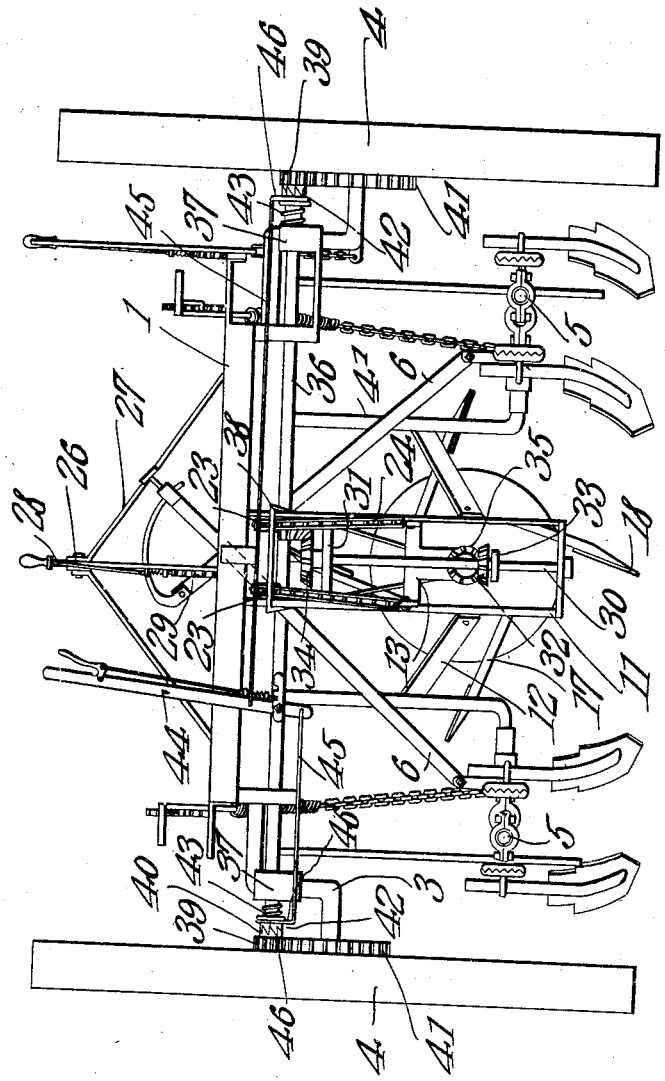

In the accompanying drawings:—Figure 1 is a top plan view of the cotton chopper applied to a cultivator. Fig. 2 is a side elevation of the same. Fig. 3 is a front elevation of the same. Fig. 4 is a rear end elevation of the same. Fig. 5 is a top plan view of the intermediate portion of the chopper attachment, showing the end portions in section.

The cultivator to which the attachment is adapted to be applied consists of a frame 1, which includes a tongue 2 and an arch axle 3. Supporting wheels 4 are journaled to the extremities of the axle 3, and an arch bar 4' depends from the frame 1. Beams 5 are pivotally connected at their forward ends with the extremities of the arch bar 4' in the usual manner, and levers 6 are pivotally connected at their lower ends with the said beams 5 and are fulcrumed together and adjustably connected at their upper ends as at 7 (see Fig. 4) in the usual manner. Inasmuch as the structure heretofore described is that of the usual form of a cultivator, it is thought that further detailed description thereof is unnecessary.

A U-shaped guide 8 depends from the rear portion of the tongue 2 in advance of the frame 1, and is held in a fixed position with relation to the said tongue by means of braces 9. A bearing block 10 is slidably mounted in the guide 8. A U-shaped guide 11 depends from the rear portion of the frame 1 and is held in fixed position with relation thereto by braces 12 connected at their rear ends with the said guide 11 and at their forward ends with the arch bar 4'. A yoke 13 is slidably mounted in the guide 11. A shaft 14 is journaled for rotation at its forward end in the bearing of the block 10, and at its rear end is journaled in the yoke 13. A disk 15 is adjustably mounted upon the forward portion of the shaft 14 and is movable to an adjusted position by means of a rod 16. By pushing or pulling the rod 16 the disk 15 is adjusted along the shaft 14 as above indicated. Arms 17 are tangentially arranged with relation to arcs struck from the center of the disk 16, and at their outer ends are provided with hoe-blades 18. Sprocket wheels 19 are journaled for rotation upon the tongue 1, and sprocket wheels 20 are fixed to a shaft 21, which is journaled for rotation upon the frame 1. Sprocket chains 22 are attached at their lower forward ends to the sides of the bearing blocks 10 and pass over the sprocket wheels 19, and at their rear ends are attached to the peripheries of the sprocket wheels 20. Sprocket wheels 23 are journaled for rotation at the rear end of the frame 1, and sprocket chains 24 are attached at their lower rear ends to the yoke 13 and pass up over the sprocket wheels 23, and at their forward ends are attached to the peripheries of the sprocket wheels 20. The sprocket chains 22 and 24 are adapted to wind upon the sprocket wheels 20 in opposite directions. A sprocket wheel 25 is fixed to the shaft 21 between the sprocket wheels 20. A sprocket wheel 26 is journaled in arms 27, which are mounted upon the frame 1. A lever 28 is fulcrumed upon the frame 1, and a sprocket chain 29 is connected at one end with the said lever and passed over the sprocket wheel 26, and at its forward end is attached to the periphery of the sprocket wheel 25 upon the shaft 21.

A non-circular shaft 30 is journaled at its lower end upon the lower portion of the guide 11 and at its upper end in a cross-bar 31, located between the upper portions of the said guide. A beveled pinion 32 is slidably mounted upon the shaft 30 and is supported upon a bracket 33 forming a depending portion of the yoke 13. A beveled pinion 34 is fixed at the upper end of the shaft 30 and is located above the crosspiece 31. A beveled pinion 35 is fixed to the rear end of the shaft 14 and meshes with the beveled pinion 32, which is slidably mounted upon the shaft 30. The opening in the pinion 32 which receives the shaft 30 is non-circular, and consequently, while the said pinion 32 may slide upon the shaft, it is compelled to rotate with the same. A shaft 36 is journaled in bearing blocks 37 which are attached to the frame 1 at any suitable point, and the said shaft 36 is provided at intermediate point with a beveled pinion 38 which meshes with the beveled pinion 34. Pinions 39 are loosely mounted upon the ends of the shaft 36 and are provided with clutch hubs 40. Gear wheels or rims 41 are fixed for rotation with the ground wheels 4 and mesh with the pinions 39. Clutch members 42 are feathered upon the end portions of the shaft 36 and are adapted to engage the clutch hub 40 of the pinion 39. Coil springs 43 surround the end portions of the shaft 36 and are interposed between the outer faces of the bearings 37 and the inner ends of the clutch members 42. The said springs are under tension with a tendency to hold the outer ends of the clutch members in engagement with the clutch hubs 40 of the pinions 39. A lever 44 is fulcrumed to the frame 1 of the cultivator, and rods 45 are pivotally attached at their inner ends with the said lever 44, but at opposite sides of the fulcrum point thereof. The outer ends of the rods 45 are provided with loops or eyes 46, which receive the clutch members 42. By this arrangement it will be observed that under normal conditions the springs 43 hold the clutch members 42 in engagement with the hub 40 of the pinion 39, and when such is the case and the cultivator is moving in a forward direction, rotary motion is transmitted from the supporting wheels 4 to the gear wheels 41 and pinions 39 to the shaft 36, from which rotary movement is transmitted through the intermeshing pinions 38 and 34 to the shaft 30, and from thence such movement is transmitted through the intermeshing pinions 32 and 35 to the shaft 14. Thus the disk 15 is rotated and the hoes carried thereby are swung about the axis of the shaft 14 and cut out the stand of plants at intervals. The engaging teeth of the clutch members 42 and the clutch hub 40 are such that should either one of the ground wheels 4 turn in a backward direction an escapement is permitted between the clutch hub and the clutch member, whereby the said ground wheel is permitted to turn rearwardly. But any forward movement on the part of the ground wheels will transmit motion to the clutch members and the clutch hub and cause the same to engage and transmit rotary movement from the said ground wheels to the shaft 36 as above indicated. When the lever 44 is swung so that the rods 45 are moved longitudinally the clutch members 42 are moved against the tension of the springs 43 and disengaged from the hub 40 of the pinion 46. Thus the supporting wheels 4 are free to rotate in either direction without rotating the shaft 36. By swinging the lever 28 to the rear the sprocket chain 29 is unwound from the sprocket wheel 25, and the sprocket wheels 20 and the shaft 21 are rotated. Thus the chains 22 and 24 are wound upon the peripheries of the wheels 20, and the shaft 14 and its attachments are elevated. By moving the lever 28 in a forward direction the weight of the shaft 14 and its attachments will cause the said shaft to descend, and the chains 22 and 24 will unwind from the peripheries of the wheels 21, while the chain 29 will wind upon the intermediate wheel 25. Thus means is provided for raising and lowering the disk 15 and the hoes carried thereby to cause the said hoe-blades to operate at any desired distance below the surface of the soil, or at or above the surface of the soil, as desired.

Having described my invention, what I claim as new, and desire to secure, by Letters Patent, is:—

In combination with a wheel-mounted frame, a chopper comprising guides depending from the frame, members slidably mounted in the guides, a shaft journaled for rotation in the members, a disk adjustably mounted upon the shaft, hoe-blades mounted upon the disk, a shaft journaled for rotation upon the frame, wheels fixed to the last said shaft, chains adapted to wind upon the said wheels in opposite directions, and being connected with the members slidably mounted in the guides, a lever mechanism mounted upon the frame, a chain connected at one end with the said lever mechanism and adapted to wind about the axis of the said shaft which is journaled upon the frame, a vertically disposed shaft journaled upon one of the said guides, a pinion slidably mounted upon the last said shaft and operatively engaging the first said shaft, a shaft transversely journaled with relation to the frame, means operatively connecting the last said shaft with the said vertically disposed shaft, means operatively connecting the said transversely disposed shaft with the supporting wheels of the frame, the last said means including clutch members, a lever fulcrumed upon the frame, and rods operatively connecting said lever with the said clutch members, the said rods at their inner ends being pivotally connected with the lever at opposite sides of the fulcrum point thereof.

In testimony that I claim the foregoing as my own, I have hereto affixed my signature in the presence of two witnesses.

IRVIN F. HARRIS.

Witnesses:
L. R. CAMPBELL,
J. T. SULLIVAN.